United States Patent Office 3,406,131
Patented Oct. 15, 1968

3,406,131
PROCESS FOR MAKING EPOXY RESIN FOAM PLASTICS
Alfred Kühlkamp, Hofheim, Taunus, Otto Mauz, Frankfurt am Main, and Siegfried Göwecke, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed July 16, 1965, Ser. No. 472,725
Claims priority, application Germany, July 17, 1964, F 43,467
1 Claim. (Cl. 260—2.5)

ABSTRACT OF THE DISCLOSURE

An improved process has been provided for the foaming and hardening of an epoxy resin derived from epichlorohydrin and a polyhydroxy compound. The foaming and hardening is effected in the presence of amines and carbamates of the formula:

$$^{+}H_3N-(CH_2)_3-O-(R-O)_n-(CH_2)_3-NH-COO^-$$

and a carbamate derived from an amine of the formula:

$$HO-R_3-NH-R_2-(NH-R_1)_{n_1}-NH_2$$

in which R, $R_1$ and $R_2$ represent an aliphatic, cycloaliphatic, aromatic or araliphatic radical, and $R_3$ represents an aliphatic, cycloaliphatic or araliphatic radical and in which n is a whole number within the range of 0 to 30 and $n^1$ is a whole number within the range of 0 to 10. The advantages accruing to the process because of the use of the specified carbamate is based on the solubility of the carbamates in the amine, which may be employed as a hardening agent, as well as in the epoxy resin itself. As a result, a fine control of pore formation as well as hardening may be achieved.

---

The present invention relates to epoxy resin foam plastics and a process for making them.

It is known that foam plastics can be made from polyepoxy compounds. U.S. Patent 3,025,249, for example, describes a process for foaming epoxides in the presence of trialkoxy-boroxines, amines and solvents or fluorinated hydrocarbons. U.S. Patent 2,993,014 teaches foaming epoxy resins with cork powder in the presence of basic hardeners. U.S. Patent 3,051,665 discloses a process for foaming epoxides with halogenated hydrocarbons in the presence of boron fluoride or its complex compounds. U.S. Patent 3,028,344 describes epoxy resin foams comprising an epoxy resin, a basic or acid hardener, the α-sodio-sodium salt of a fatty acid and a solvent serving as foaming agent. Other patents mention readily decomposable foaming agents such as, for example, ammonium bicarbonate, benzenesulfohydrazide, azodiisobutyric acid dinitrile, and p,p'-oxy-bis-(benzene-sulfohydrazide).

The aforesaid processes have the disadvantage that elevated temperatures are required for decomposing the foaming agents splitting off gas and that the foaming agents are expensive and are substantially completely lost during foaming.

Now we have found that the above disadvantages can be avoided by foaming and hardening an epoxy resin under the action of a carbamate of an amine or polyamine.

To carry out the foaming and hardening of the epoxy resins, the said carbamates may be used alone. There may be used a single carbamate or a mixture of several carbamates. It is also possible, however, to use a mixture of an amine and a carbamate. The use of amine-carbamate mixtures is in many cases advantageous since it enables a desired unit weight and the mechanical properties of the foam plastic to be easily adjusted. Also, foaming and hardening reaction can be tuned to each other in a simple manner.

When an amine-carbamate mixture is used for the foaming and hardening process in accordance with the invention, the composition of the amine-carbamate mixture necessary for each epoxy equivalent of the epoxy resin may vary within the range of 0.9 equivalent of amine:0.1 equivalent of carbamate to 0.1 equivalent of amine:0.9 equivalent of carbamate. In special cases it may be advantageous to use other than the stoichiometric amounts of free amine and carbamate.

The process of the invention offers the particular advantage and the advance in the art that no impurities are introduced into the resin by the foaming agent and that the amine or polyamine liberated by the splitting off of carbon dioxide from the carbamate serves to harden the resin. For a given epoxy resin it is therefore possible to use the carbamate having the most favorable decomposition temperature, thus obtaining the most favorable foaming and hardening conditions. It is furthermore possible and advantageous in many cases to use the carbamates together with polyamines. For example, a very reactive carbamate, for example ethylenediamine carbamate, may be mixed with a less reactive amine hardener, for example a polyamidoamine, whereby the foam obtained is first rapidly hardened to a certain degree and then slowly further hardened by the polyamidoamine. In this manner, the liberation of a great amount of heat during hardening, which may carbonize the resin, can be avoided. It is furthermore possible to adjust a desired pore density by choosing an appropriate carbamate or an appropriate ratio between carbamate and polyamine.

The foaming process in accordance with the invention is applicable to polyepoxy compounds of various kind, for example, those based on mononuclear phenols containing two hydroxyl groups such as catechol resorcinol, hydroquinone, heptylresorcinol; multinuclear phenols or bisphenols such as bis-(4-hydroxyphenyl)-methane, bis-(4-hydroxyphenyl)-ethane, bis-(4-hydroxyphenyl)-dimethylmethane, bis-(4-hydroxyphenyl)-butane, bis-(4-hydroxyphenyl-2,3,5,6-tetrachlorophenyl)-2,2-propane, 4,4'-dioxybenzophenone, bis-(4-hydroxyphenyl)-cyclohexane, bis-(4-hydroxyphenyl)-phenylmethane, bis-(4-hydroxy-3-methylphenyl)-dimethylmethane, bis-(4-hydroxy-3-tert.-butylphenyl)-dimethylmethane, tris-(4-hydroxyphenyl)-methane, bis-(4-hydroxyphenyl)-pentanoic acid ester; aliphatic polyepoxides of diols or polyols, for example, ethylene glycol, 1,4-butanediol, glycerol, hexanetriol, pentaerythritol and their high molecular weight reaction products with ethylene oxide and/or propylene oxide.

As additional hardeners there may advantageously be used in the process of the invention aliphatic or cycloaliphatic primary, secondary or primary-secondary polyamines, or aromatic diamines or diaminodiphenyl alkanes.

Exemplary of such compounds are ethylenediamine, diethylenetriamine, triethylenetetramine, tetraethylenepentamine, pentaethylenehexamine, propylenediamine, dipropylenetriamine, N - cyclohexylpropylenediamine-(1,3), N-hydroxyethylpropylenediamine, 1,6-hexamethylenediamine, piperazine, phenylenediamine, 4,4-diaminodiphenylmethane, 4,4-diaminodicyclohexylmethane, N-hydroxyethylpropylenediamine, N,N'-bis-(hydroxyethyl)-diethylenetriamine, N - (hydroxypropyl) - diethylenetriamine, N-(hydroxypropyl)-1,2-diaminopropane, dicyandiamide, and polyamidoamines.

The carbamates are obtained in known manner by reacting amines or polyamines with carbon dioxide. For an example, The preparation of ethylenediamine carbamate may be mentioned: 100 grams of dry ethylenediamine are dissolved in 500 cc. of absolute methanol, and dry carbon dioxide is introduced for about 4 hours at −10° C. The solvent is removed in vacuo and the residue is taken up in ether. The carbamate which is insoluble in ether is rapidly sucked off, washed with a small amount of ether and immediately dried at room temperature in a vacuum drier (cf. J. Am. Chem. Soc. 73 (1951), page 1829 and J. Am. Chem. Soc. 70 (1948), page 3865).

The carbamates of, for example, 1,2-propylenediamine, 1,3-propylenediamine, 1,4-butylenediamine, diethylenetriamine, 1,6-hexamethylenediamine, piperazine or 4,4'-diamino-dicyclohexylmethane are obtained by analogous reactions.

The manufacture of the foam plastics in accordance with the invention is carried out such that the calculated amount of carbamate is stirred into the resin and the mixture so obtained is heated to the decomposition temperature of the carbamate. It is also possible to use mixtures of carbamate and polyamine. If low molecular weight polyamines are used, hardening sets in at room temperature. By an appropriate choice of the carbamate and, if desired, the polyamine, the foam producing reaction and the hardening reaction can be tuned to each other such that foam plastics free from stress cracking and having good mechanical strength properties can be obtained.

In an advantageous form of the process of the invention, liquid carbamates that are soluble in amines and polyepoxy resins are used for foaming and hardening epoxy resins. Such carbamates are, for example, those containing one or more ether bridges per molecule. The last-mentioned ether carbamates can be obtained, for example, by known processes by additive combination of acrylonitrile with di- or polyols, subsequent hydrogenation and reaction of the resulting hydrogenation products with carbon dioxide. They correspond to the following formula

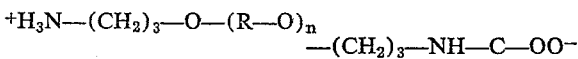

in which R represents an organic radical, for example, a branched or unbranched aliphatic, cycloaliphatic, aromatic or araliphatic radical and $n$ is a whole number within the range of from 0 to 30, advantageously from 0 to 10.

As starting materials for the addition of acrylonitrile there may be used, for example, glycol, butanediol-1,4, butanediol-1,3, trimethylolpropane, pentaerythritol, water, diethylene glycol, dibutylene glycol, hydroquinone, resorcinol, 4,4'-dioxydiphenylmethane, and 1,4-dimethylolhexane.

These ether carbamates to be used in accordance with the invention have the particular advantage that the melting point of the carbamate is considerably reduced by the incorporation of ether bridges. The carbamates have no tendency to crystallization in a temperature range of 20 to 80° C. and are soluble at that temperature in amines and the epoxy resins used. The foams obtained with these carbamates are therefore distinguished by very uniform properties and an extremely uniform pore structure.

Foaming and hardening may be carried out at a temperature within the range of, for example, 20 to 200° C. Advantageously, a temperature within the range of 50 to 100° C. is used since decomposition of the carbamates and hardening reaction are best tuned to each other at that temperature.

In a further advantageous form of the process of the invention, epoxy resins are foamed and hardened with carbamates of monoaddition products of 1,2-alkylene oxides with di- or polyamines. Monoaddition products of 1,2-alkylene oxides with di- or polyamines that can be reacted to the corresponding carbamates and the preparation of which does not fall under this invention correspond to the following formula $$HO-R_3-NH-R_2-(NH-R_1)_n-NH_2$$

in which $R_1$ and $R_2$ represent an organic radical, for example, branched or unbranched saturated or unsaturated aliphatic, cycloaliphatic, araliphatic or aromatic radicals, $R_3$ represents a branched or unbranched saturated or unsaturated aliphatic, cycloaliphatic or araliphatic radical and $n$ is a whole number within the range of 0 to 10, advantageously 0 to 4. Examples of suitable 1,2-alkylene oxides are ethylene oxide, propylene oxide, butadiene monoxide, styrene oxide, 1,1-dimethylethylene oxide, benzylethylene oxide, 2,4,4-trimethylpentane oxide-1,2 and cyclohexene oxide.

Examples of the amine component are ethylene diamine, propylenediamine-1,3, propylenediamine-1,2, tetramethylenediamine, hexamethylenediamine, trimethylhexamethylenediamine, diaminoisononadecane, 4,4'-diaminodicyclohexylmethane, 1,4-diaminomethylcyclohexane, p-xylylenediamine, diethylenetriamine, triethylenetetramine, dipropylenetriamine, m-phenylenediamine and 4,4'-diaminodiphenylmethane.

These carbamates to be used in accordance with the invention have the particular advantage that the melting point of the carbamate is considerably reduced by the reaction with 1,2-alkylene oxides. The carbamates show no tendency to crystallization at a temperature within the range of 20 to 80° C. and are soluble at that temperature in amines and related epoxy resins. The foams obtained with these carbamates are therefore distinguished by very uniform properties and an extremely uniform pore structure.

Besides serving as hardeners and foaming agents, the carbamates to be used in accordance with the last mentioned form of the invention have also a catalytic action on the hardening of the epoxide owing to their hydroxyl group and favorably influence the adjustment of the pores.

The last mentioned group of carbamates, like those mentioned above, may also be used alone or in admixture with one another for the foaming and hardening of epoxy resins. They may also be used in admixture with amines, the amine component being one of the amines mentioned above by way of example for the reaction with 1,2-alkylene oxides. This mode of working is advantageous in many cases since it enables a desired unit weight and the mechanical properties of the foam plastic to be easily adjusted. It also enables the foaming and the hardening reaction to be tuned to each other in a simple manner.

Foaming and hardening may be carried out at a temperature within the range of 20 to 200° C. Advantageously, a temperature within the range of 50 to 100° C. is used since decomposition of the carbamates and hardening reaction are best tuned to one another at that temperature.

The epoxy resins to be formed and hardened by the process of the invention may be admixed with a great variety of additives. By adding, for example, 0.01 to 5%, advantageously 0.2 to 1.2%, calculated on the weight of the epoxy resin, of a surface active substance, for example, polysiloxanes, block polymers of polysiloxanes with polyethylene oxides, oxethylated fat alcohols, oxethylated fatty amines, oxethylated fatty acids, oxethylated alkyl phenols, fat alcohol sulfates, alkyl sulfonates, aryl sulfonates, block condensation products of polyethylene oxides and polypropylene oxide, the formation of uniform foams having a determined pore density can be favored. It is also possible to add paraffin oils and waxes.

It is furthermore possible to add various inert substances to the epoxy resins, for example, fillers, dyestuffs, plasticizers and fire-retarding agents.

The foam plastics obtained by the process of the invention may advantageously be used for heat, cold and sound insulation. They may also be used as insulating materials in the field of electrical engineering and find various applications in the construction of airplanes, rockets and car bodies.

The following examples serve to illustrate the invention but they are not intended to limit it thereto, the parts being by weight.

EXAMPLE 1

13.5 grams of ethylenediamine carbamate and 1 gram of silicone oil were introduced, while stirring well with a glass rod, into 100 grams of a reaction product of epichlorhydrin and 4,4'-dioxy-diphenyl-2,2-propane of an epoxide equivalent of 192 which had been obtained in known manner, and the mixture so obtained was heated to about 70° C. The carbon dioxide split off from the carbamate expanded the epoxy resin, the foam hardening simultaneously. The foam plastic so obtained was extremely rigid and had a unit weight of 45 kg./m.$^3$.

EXAMPLE 2

100 grams of a reaction product of epichlorhydrin and 4,4'-dioxy-diphenyl-2,2-propane of an epoxide equivalent of 192 which had been obtained in known manner, were thoroughly mixed with a mixture of 6.7 grams of ethylenediamine carbamate, 6 grams of diethylenetriamine and 0.5 gram of polyethylene oxide. After some minutes, foaming and hardening occurred with spontaneous heating of the reaction mixture. The foam plastic so obtained had a unit weight of 75 kg./m.$^3$.

EXAMPLES 3 TO 10

The epoxy resin foams indicated in the following table were prepared as described in Examples 1 and 2. As resin there was used a reaction product of epichlorhydrin and 4,4'-dioxy-diphenyl-2,2-propane of an epoxide equivalent of 192 (epoxide number 0.52) and of 176 (epoxide number 0.57), respectively, which had been obtained in known manner. In the following table, these two types have been designated as resin.

| Example | Weight and reaction components | Unit weight of foam plastic in kg./m.$^3$ |
|---|---|---|
| 3 | 100 resin (ep. equiv. 192), 17 piperazine carbamate, 3.9 ethylenediamine, 1.0 silicone oil. | 46 |
| 4 | 100 resin (ep. equiv. 192), 17 piperazine carbamate, 6 diethylenetriamine. | 116 |
| 5 | 100 resin (ep. equiv. 192), 17 piperazine carbamate, 7.5 hexamethylenediamine, 0.5 silicone oil. | 79 |
| 6 | 100 resin (ep. equiv. 192), 6.7 ethylenediamine carbamate, 6.7 p-phenylenediamine, 0.5 silicone oil. | 250 |
| 7 | 100 resin (ep. equiv. 176), 22.8 hexamethylenediamine carbamate, 0.5 silicone oil. | 56 |
| 8 | 100 resin (ep. equiv. 176), 11.4 hexamethylenediamine carbamate, 4.3 ethylenediamine, 0.5 silicone oil. | 95 |
| 9 | 100 resin (ep. equiv. 176), 11.4 hexamethylenediamine carbamate, 6.0 diethylenetriamine, 0.5 silicone oil. | 76 |
| 10 | 100 resin (ep. equiv. 176), 11.4 hexamethylenediamine carbamate, 8.3 hexamethylenediamine, 0.5 silicone oil. | 80 |

EXAMPLE 11

100 grams of glycerol triglycidyl ether having an epoxide equivalent of 160 were thoroughly mixed with 14 grams of hexamethylenediamine carbamate and 15 grams of piperazine. After about 2 minutes, foaming and cross-linking set in with very strong liberation of heat. Contrary to the foams of Examples 1 to 10, the foam obtained in this example was of the nature of soft rubber.

EXAMPLE 12

100 grams of glycerol triglycidyl ether having an epoxide equivalent of 160 were stirred with 22.3 grams of piperazine carbamate, 15 grams of ethylenediamine carbamate and 70 grams of an amidoamine of a dimerized fatty acid of linseed oil. After a few minutes, foaming and hardening took place while carbon dioxide was split off from the carbamate. The foam so obtained was very soft and had fine to medium sized pores.

EXAMPLE 13

100 grams of epoxy resin having an epoxide equivalent of 176, 17 grams of 4,4'-diamino-dicyclohexyl-methane carbamate, 5 grams of ethylenediamine and 0.5 gram of silicone oil were thoroughly mixed and somewhat heated. At about 60 to 70° C., the carbamate was decomposed with splitting off of carbon dioxide and the epoxide resin began to harden. A very rigid foam plastic having a unit weight of 126 kg./m.$^3$ was obtained.

EXAMPLE 14

100 grams of glycerol triglycidyl ether having an epoxide equivalent of 160 were thoroughly mixed at 20° C. with 21 grams of 4,4'-diamino-dicyclohexyl-methane carbamate, 7 grams of triethylenetetramine and 0.5 g. of silicone oil. After some minutes, foaming and hardening of the epoxy resin took place with strong liberation of heat. An elastic soft foam was obtained.

EXAMPLE 15

95 parts of a reaction product of epichlorhydrin and 4,4'-dioxy-diphenyl-2,2-propane of an epoxide equivalent of 190 which had been obtained in known manner, were thoroughly mixed with 5.5 parts of m-phenylenediamine, 4.5 parts of diaminoisononadecane, 20 parts of diaminoisononadecane carbamate and 0.4 part of silicone oil. Owing to the exothermic hardening reaction which set in, the temperature in the reaction mixture rose. At a temperature of about 60 to 70° C. the carbamate had dissolved in the epoxy resin and decomposition of the carbamate began with splitting off of carbon dioxide. A rigid foam plastic having a unit weight of 45 kg./m.$^3$ was obtained.

EXAMPLE 16

5 parts of 4,4'-diamino-diphenyl-methane, 4 parts of trimethylhexamethylenediamine, 15 parts of trimethylhexamethylenediamine carbamate and 0.4 part of silicone oil were introduced, while stirring, into a mixture of 50 parts of a reaction product of epichlorhydrin and 4,4'-dioxy-diphenyl-2,2-propane of an epoxide equivalent of 500 which had been obtained in known manner and 76 parts of a reaction product of epichlorhydrin and 4,4'-dioxy-diphenyl-2,2-propane having an epoxide equivalent of 190 which had been obtained in known manner, the said mixture having a temperature of 50° C. After some minutes, the temperature had risen to 70° C., the carbamate had dissolved in the epoxy resin and foaming of the resin mixture set in. A rigid foam plastic having a unit weight of 51 kg./m.$^3$ was obtained.

EXAMPLE 17

50 parts of a reaction product of epichlorhydrin and 4,4'-dioxy-diphenyl-2,2-propane of an epoxide equivalent of 500 which had been obtained in known manner.

57 parts of a reaction product of epichlorhydrin and 4,4'-dioxy-diphenyl-2,2-propane of an epoxide equivalent of 190 which had been obtained in known manner.

10 parts of 4,4'-diaminodiphenylmethane.

2 parts of ethylene glycol-bis-γ-aminopropyl ether.

9 parts of ethylene glycol-bis-γ-aminopropyl ether carbamate.

0.4 part of phenylmethylpolysiloxane (phenylmethylpolysiloxane DC 710 of Dow Corning Corp.).

To the fused epoxy resin mixture the other components were added at 50 to 60° C. When the batch of foam plastic was mixed vigorously, the temperature rose to 70 to 80° C. within 10 to 15 minutes owing to the exothermic hardening reaction which set in. At that temperature of 70 to 80° C., the carbamate-amine mixture had dissolved in the epoxy resin and foaming set in with the beginning decomposition of the carbamate. Expansion was terminated after 3 to 8 minutes, and hardening after a further 10 to 25 minutes. A rigid foam plastic was obtained which was free from bubbles and stress cracking and had a very uniform pore structure and a unit weight of 65 grams per liter. The proportion of closed pores was 80%.

EXAMPLE 18

50 parts of a reaction product of epichlorhydrin and 4,4'-dioxy-diphenyl-2,2-propane of an expoxide equivalent of 500 which had been obtained in known manner.

76 parts of a reaction product of epichlorhydrin and 4,4'-dioxy-diphenyl-2,2-propane of an epoxide equivalent of 190 which had been obtained in known manner.

5 parts of 4,4'-diaminodicyclohexylmethane.

5 parts of 1,4-butanediol-bis-γ-aminopropyl ether.

19 parts of 1,4-butanediol-bis-γ-aminopropyl ether carbamate.

0.5 part of a reaction product of sorbite with palmitic acid and ethylene oxide (Tween 40 of Atlas Chemical Co.).

The components were mixed and foamed as described in Example 17. The foam plastic so obtained had a unit weight of 49 grams per liter. The proportion of closed pores was 75%.

EXAMPLE 19

50 parts of a reaction product of epichlorhydrin and 4,4'-dioxy-diphenyl-2,2-propane of an epoxide equivalent of 500 which had been obtained in known manner.

76 parts of a reaction product of epichlorhydrin and 4,4'-dioxy-diphenyl-2,2-propane of an epoxide equivalent of 190 which had been obtained in known manner.

5.5 parts of m-phenylenediamine.

7 parts of dibutylene glycol-bis-γ-aminopropyl ether.

1.6 parts of dibutylene glycol-bis-γ-aminopropyl ether carbamate.

0.4 part of a condensation product of polypropylene glycol and ethylene oxide (Pluronic L 81 of Wyandotte Chemicals Corp.).

The components were mixed and foamed as described in Example 17. A hard foam plastic having a unit weight of 55 grams per liter was obtained. The proportion of closed pores amounted to 78%.

EXAMPLE 20

95 parts of a reaction product of epichlorhydrin and 4,4'-dioxy-diphenyl-2,2-propane of an epoxide equivalent of 190 which had been obtained in known manner.

3 parts of m-phenylenediamine.

5 parts of ethylene glycol-bis-γ-aminopropyl ether.

17 parts of ethylene glycol-bis-γ-aminopropyl ether carbamate.

0.3 part of phenylmethylpolysiloxane (Phenylmethylpolysiloxane DC 710 of Dow Corning Corp.).

The diglycidyl ether was reacted with the phenylenediamine. The other components were then added and the mixture was foamed as described in Example 17. The foam so obtained had a unit weight of 36 grams per liter.

EXAMPLE 21

50 parts of a reaction product of epichlorhydrin and 4,4'-dioxy-diphenyl-2,2-propane of an epoxide equivalent of 500 which had been obtained in known manner.

57 parts of a reaction product of epichlorhydrin and 4,4'-dioxy-diphenyl-2,2-propane of an epoxide equivalent of 190 which had been obtained in known manner.

4.5 parts of ethylene glycol-bis-γ-aminopropyl ether.

3.5 parts of N-(β-hydroxyethyl)-ethylenediamine.

10 parts of N-(β-hydroxyethyl)-ethylenediamine carbamate.

0.4 part of phenylmethylpolysiloxane (phenylmethylpolysiloxane DC 710 of Dow Corning Corp.).

To the fused epoxy resin mixture the other components were added at 50 to 60° C. When the batch of foam plastic was mixed vigorously, the temperature rose to 70 to 80° C. within 10 to 15 minutes owing to the exothermic hardening reaction which set in. At that temperature of 70 to 80° C., the carbamate-amine mixture had dissolved in the epoxy resin and foaming set in due to the beginning decomposition of the carbamate. Expansion was terminated after 3 to 8 minutes, and hardening after a further 10 to 25 minutes. A rigid foam plastic was obtained which was free from bubbles and stress cracking and had a very uniform pore structure and a unit weight of 57 grams per liter. The compressive strength was 3.8 kg./cm.$^2$. The proportion of closed pores was 81%.

EXAMPLE 22

50 parts of a reaction product of epichlorhydrin and 4,4'-dioxy-diphenyl-2,2-propane of an expoxide equivalent of 500 which had been obtained in known manner.

57 parts of a reaction product of epichlorhydrin and 4,4'-dioxy-diphenyl-2,2-propane of an epoxide equivalent of 190 which had been obtained in known manner.

5 parts of 4,4'-diaminodiphenylmethane.

4 parts of N-(β-hydroxypropyl)-ethylenediamine.

11 parts of N-(β-hydroxypropyl)-ethylenediamine carbamate.

0.4 part of a reaction product of sorbite with palmitic acid and ethylene oxide (Tween 40 of Atlas Chemical Co.).

The components were mixed and foamed as described in Example 21. The foam plastic so obtained had a unit weight of 51 grams per liter. The proportion of closed pores was 83%, the compressive strength 4.1 kg./cm.$^2$.

EXAMPLE 23

50 parts of a reaction product of epichlorhydrin and 4,4'-dioxy-diphenyl-2,2-propane of an epoxide equivalent of 500 which had been obtained in known manner.

76 parts of a reaction product of epichlorhydrin and 4,4'-dioxy-diphenyl-2,2-propane of an epoxide equivalent of 190 which had been obtained in known manner.

5.5 parts of m-phenylenediamine.

4 parts of N-(β-hydroxyethyl)-propylenediamine-1,3.

11 parts of N-(β-hydroxyethyl)-propylenediamine-1,3-carbamate.

0.5 part of a condensation product of polypropylene and ethylene oxide (Pluronic L 81 of Wyandotte Chemicals Corp.).

The components were mixed and foamed as described in Example 21. The foam plastic so obtained had a unit weight of 50 grams per liter. The proportion of closed pores was 77%, the compressive strength 4.8 kg./cm.$^2$.

EXAMPLE 24

50 parts of a reaction product of epichlorhydrin and 4,4'-dioxy-diphenyl-2,2-propane of an epoxide equivalent of 500 which had been obtained in known manner.

76 parts of a reaction product of epichlorhydrin and 4,4'-dioxy-diphenyl-2,2-propane of an epoxide equivalent of 190 which had been obtained in known manner.

10.5 parts of 4,4'-diaminodicyclphexylmethane.

4.5 parts of N-(β-hydroxypropyl)-propylenediamine-1,3.

12 parts of N-(β-hydroxypropyl)-propylenediamine-1,3-carbamate.

0.5 part of a condensation product of polypropylene and ethylene oxide (Pluronic L 31 of Wyandotte Chemicals Corp.).

The components were mixed and foamed as described in Example 21. The foam plastic so obtained had a unit weight of 47 grams per liter. The proportion of closed pores amounted to 70%, the compressive strength to 3.8 kg./cm.$^2$.

We claim:

1. In the process of foaming and hardening of an epoxy resin derived from a reaction product of epichlorohydrin and a polyhydroxy compound which foaming is effected in the presence of a carbamate and an amine wherein for each epoxy equivalent of the epoxy resin 0.9 equivalents of an amine: 0.1 equivalents of a carbamate to 0.1 equivalents of amine: 0.9 equivalents of carbamate are used to effect the foaming and hardening at a temperature within the range of 20 to 200° C. via an amine acting as a hardener, the improvement comprising using as a foaming and hardening agent an ether carbamate selected from at least one compound of the formula $$^+H_3N-(CH_2)_3-O-(R-O)_n-(CH_2)_3-NH-COO^-$$

and a carbamate which is the reaction product of $CO_2$ and an amine of the formula

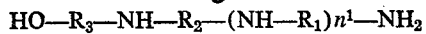

in which R, $R_1$ and $R_2$ represent an aliphatic, cycloaliphatic, aromatic or araliphatic radical, and $R_3$ represents an aliphatic, cycloaliphatic or araliphatic radical and in which $n$ is a whole number within the range of 0 to 30 and $n^1$ is a whole number within the range of 0 to 10, said carbamates being characterized as being soluble in said epoxy resin and said amine hardening agent.

References Cited

UNITED STATES PATENTS

| 2,739,134 | 3/1956 | Parry et al. | 260—2.5 |
| 3,275,587 | 9/1966 | Weller et al. | 260—2.5 |
| 3,320,187 | 5/1967 | Burt | 260—2.5 |

MURRAY TILLMAN, *Primary Examiner.*

M. FOELAK, *Assistant Examiner.*